UNITED STATES PATENT OFFICE.

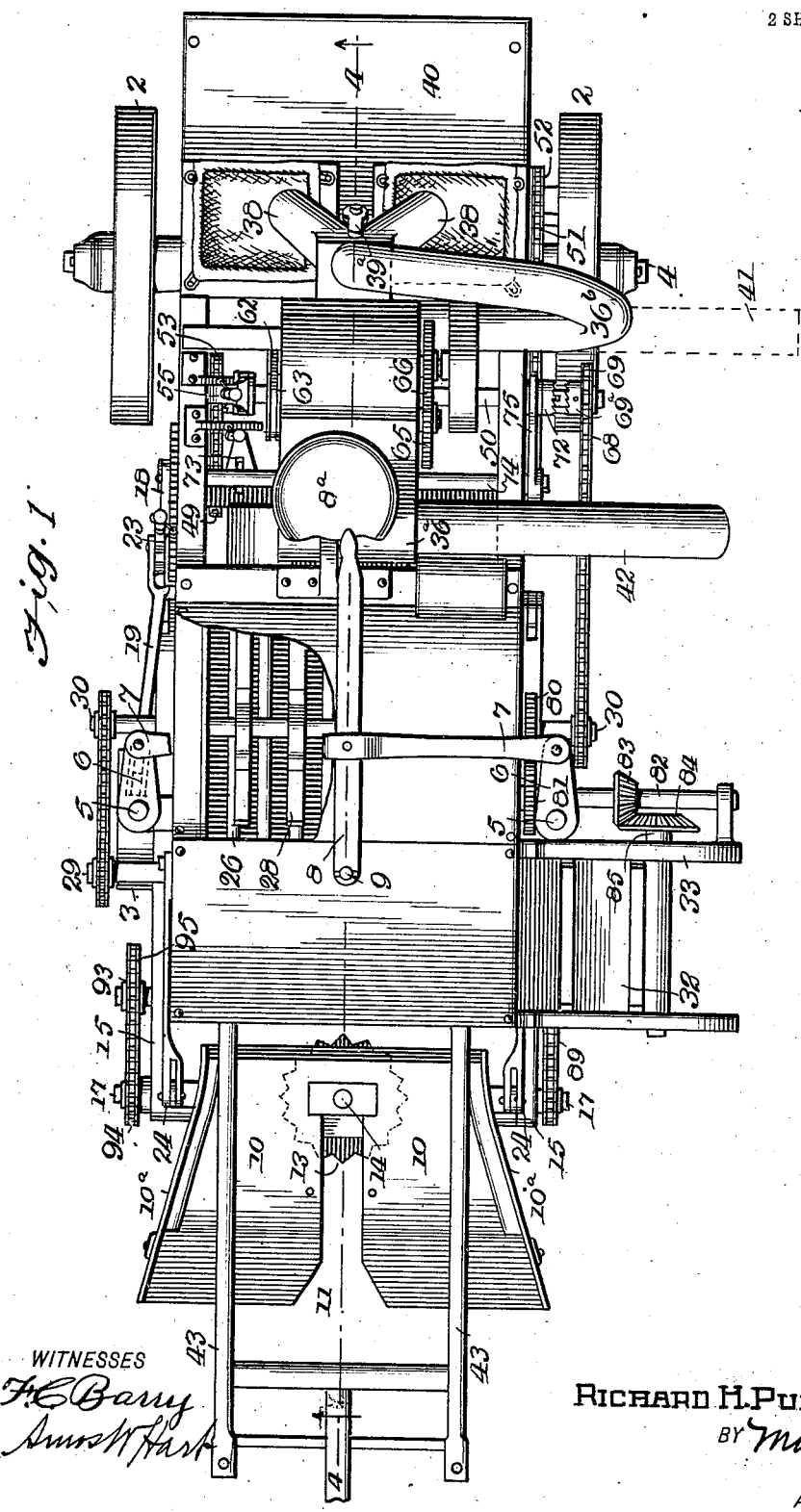

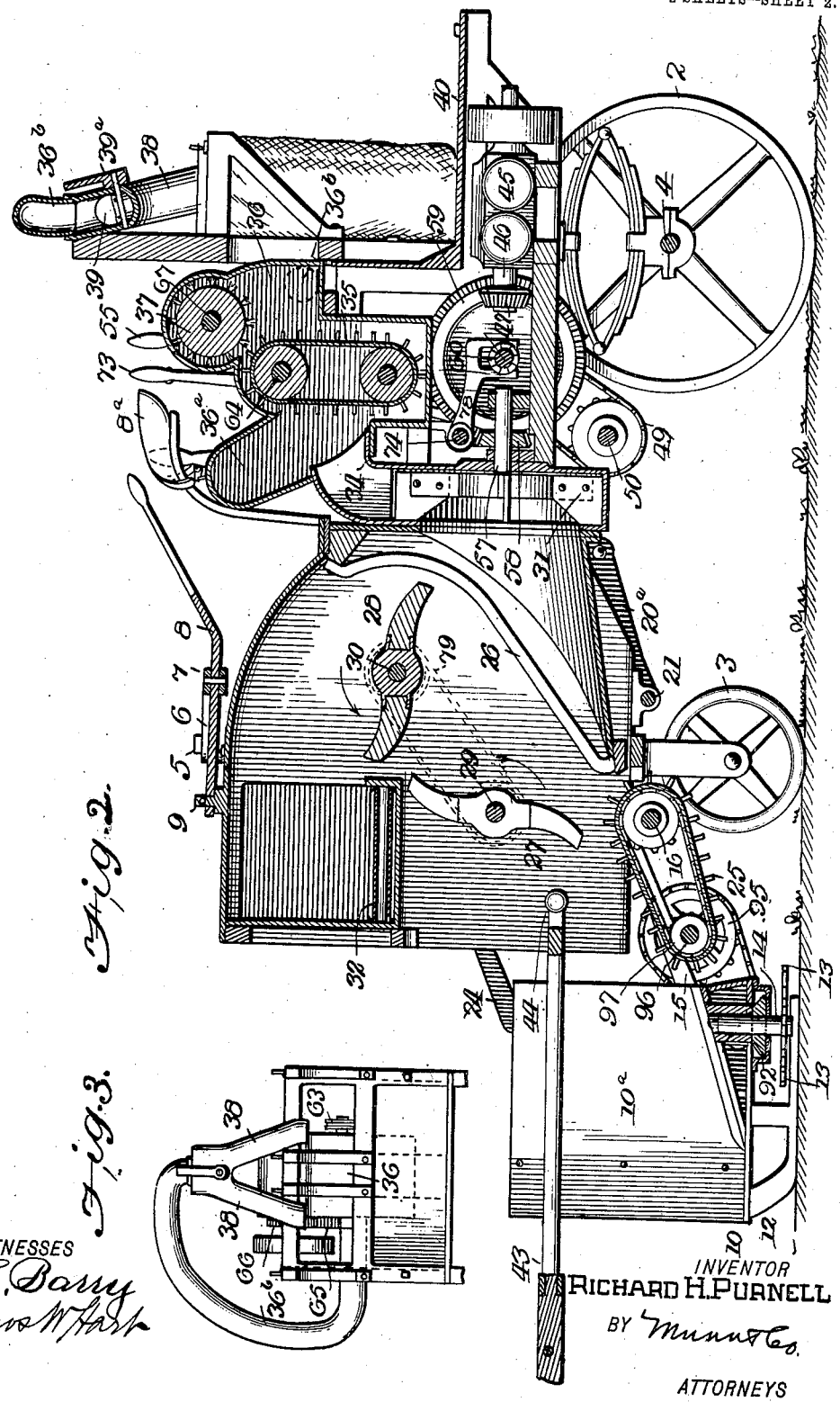

RICHARD HOPE PURNELL, OF ROSEDALE, MISSISSIPPI.

COTTON SEPARATOR AND CLEANER.

No. 896,065.  Specification of Letters Patent.  Patented Aug. 11, 1908.

Application filed September 8, 1906. Serial No. 333,786.

*To all whom it may concern:*

Be it known that I, RICHARD HOPE PURNELL, a citizen of the United States, and a resident of Rosedale, in the county of Bolivar and State of Mississippi, have invented an Improved Cotton Separator and Cleaner, of which the following is a specification.

My invention is an improvement upon the cotton separator and cleaner disclosed in my Patent #779,965 dated January 10, 1907. As in that case, the present invention is employed and I illustrate it in the accompanying drawings in connection with a harvester.

In the accompanying drawing, Figure 1 is a plan view of the machine, a portion of the top of casing being broken away to show the interior construction. Fig. 2 is a central longitudinal section of the same on the dotted line 4—4 indicated in Fig. 1. Fig. 3 is a rear end view of a portion of the machine.

The main frame of the machine is supported by two rear wheels 2 and forward wheels 3, the rear wheels being keyed to the axle 4 so that they may rotate therewith, and in case a motor is used they will thus serve as means for propelling the machine. A serrated cutter, or saw, 13, is mounted on the vertical shaft 14, held in bearings in a platform 10 which in practice is provided with lever attachments for raising and lowering substantially as indicated in my aforesaid patent.

Referring now particularly to Fig. 2, it will be understood that the cotton stalks which are severed by the rotary cutter 13 pass backward upon the endless traveling toothed apron 25. The said apron operates substantially as in my previous invention carrying the stalks backward upon a grid comprising a series of rearwardly extended and curved bars 26 which are arranged in the rear portion of a large chamber formed in the front end of the machine. In this instance, I have provided two carriers and beaters 27 and 28, the same comprising transverse shafts 29 and 30 upon which are fixed metal sockets provided with wooden arms which are arranged opposite each other and are oppositely curved. The lower beater 27 is located nearly over the rear end of the toothed apron 25, and the other 28 is located at a higher point opposite and adjacent to the upper portion of the grid 26. The stalks are both beaten and simultaneously carried upward by the beaters 27 which are revolved with due rapidity in the direction indicated by arrows, the lower beater forcing them upward upon the grid 26 so that they are in turn beaten and taken up by the upper beater 28. The fan 31 which is arranged directly in rear of the grid in a vertical plane and at right angles to the longitudinal axis of the frame of the machine creates a draft or suction by which the cotton proper is drawn through the grid and carried upward, while the bolls, or pods, and stalks slide further up on the grid until they reach and are acted on by the upper beater 28 and thrown over frontward upon the carrier 32, see Figs. 2, 3. Said carrier is formed of an endless apron having cross-slats and running on horizontal shafts, it being arranged transversely to the frame of the machine and extended outward between combined side wings and brackets 33, which constitute guides for the trash as it is carried outward by the carriers so that it is deposited on the ground. In this manner at the very outset of the operation on the product within the machine the trash is for the most part separated from the final product or cotton.

The cotton sucked through the grid 26 by the operation of the fan 31 is carried upward in the curved passage 34 and delivered at a point where it is taken up by the endless toothed apron 35 which is arranged vertically within the chamber 36. This device was employed in my former machine and also a rotary brush 37 which is arranged within the chamber at a higher point and serves to remove the cotton from the carrier 35. In this instance, in place of the cotton being discharged directly from the chamber 36 into a suitable receptacle it is conveyed off by a curved pipe 36$^a$ and by it delivered to one of two discharge tubes 38 and thereby into bags or other receptacles X which are provided and duly suspended from brackets at the rear of the machine. The curved pipe 36$^b$ connects with the chamber 36 at one side and extends laterally and upward into suitable connection with the hood from which the tubes 38 diverge. As indicated a valve 39 is arranged in the hood at the junction of the two tubes 38 and provided exteriorly with a handle 39$^a$ by which it may be adjusted to divert the cotton into either of the two bags X. The bags are suspended detachably from hooks provided in the brackets and they extend down to a platform 40.

In Fig. 1 the dotted lines at 41 indicate a pipe or tube which may be extended laterally from the chamber 36 in place of the curved pipe 36<sup>b</sup>. When such straight pipe 41 is employed it will obviously deliver the cotton at its outer extremity into any suitable receptacle that may be provided.

As indicated in Figs. 1 and 2, the front side of the chamber 36 is extended upward and forward and constitutes a hood or supplemental chamber 36<sup>a</sup>, and a lateral pipe 42 is attached to the upper portion of such hood. This hood and pipe serve to discharge laterally such trash, comprising dust, leaves, broken pieces of stalks, etc. which may be carried upward by the blast through the passage 34 above the fan. Thus two separations of trash or foreign material take place, one in the front chamber where the beaters are located, and the other in the rear chamber where the cotton is first delivered.

The machine may be hauled by a team and for this purpose shafts 43, see Figs. 1 and 2, are pivotally attached at 44 to the front portion of the frame of the machine, or the machine may be driven by a motor of any preferred kind and in such case the motor must be operatively connected with the driving axle 4 to which the wheels 2 are keyed.

Motion is imparted to the beaters 27, 28, shown in Fig. 2, through the medium of a sprocket chain 68 which runs on a sprocket wheel 69 (see Fig. 1), the latter being fixed to one end of the drive shaft 50. The lower beater shaft 29 is driven from the upper one 30 by means of the sprocket chain running on sprocket wheels as shown in Fig. 1. The spur gear 80 is mounted on the upper beater shaft 30—see Fig. 1—and the same meshes with a corresponding gear of the horizontal shaft 82 which is provided with a beveled opening 83 that meshes with a bevel gear 84 on the outer horizontal shaft 85, having its bearings in horizontal bracket 83 whereon the endless carrier 32 runs.

Figs. 1 and 2 illustrate means whereby a motor carried on a machine may be operatively connected with the rear axle for driving the machine when horses or other draft animals are dispensed with. Such means forming no part of my present invention, it is unnecessary to describe them in detail.

What I claim is:

1. A machine casing having a chamber which is open at the front, a grid arrangement inclined in the rear portion of the chamber, an endless carrier arranged horizontally and transversely in the front upper portion of the chamber, and a rotary beater located near said carrier and between it and the upper part of the grid, whereby it is adapted to throw the cotton stalks upward and forward upon the carrier so that the same may be discharged, as described.

2. A machine casing having a front chamber for receiving severed stalks, a grid, and a suction fan arranged substantially as described, two rotary beaters arranged in said chamber one in rear of and above the other, an endless traveling carrier arranged in the front upper portion of the said chamber and extending laterally from the machine, and means for imparting motion to the beaters whereby the beaters coact in forcing the stalks upward and then forward and upon the carrier all combined, substantially as described.

RICHARD HOPE PURNELL.

Witnesses:
R. B. JOHNSON,
O. F. GOZA.